United States Patent
Smits et al.

(10) Patent No.: US 9,851,439 B2
(45) Date of Patent: Dec. 26, 2017

(54) METHOD OF DETECTING A SCATTERER IN A STRUCTURE, A RADAR SYSTEM AND A COMPUTER PROGRAM PRODUCT

(75) Inventors: Felix Maria Antonius Smits, Hengelo Ov. (NL); Jacobus Johannes Maria de Wit, Delft (NL); Wilhelmus Lambertus van Rossum, The Hague (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 834 days.

(21) Appl. No.: 13/145,127

(22) PCT Filed: Feb. 22, 2010

(86) PCT No.: PCT/NL2010/050088
§ 371 (c)(1),
(2), (4) Date: Dec. 15, 2011

(87) PCT Pub. No.: WO2010/095946
PCT Pub. Date: Aug. 26, 2010

(65) Prior Publication Data
US 2012/0105268 A1    May 3, 2012

(30) Foreign Application Priority Data

Feb. 20, 2009  (EP) .................................... 09153368
Mar. 19, 2009  (EP) .................................... 09155662

(51) Int. Cl.
*G01S 13/00* (2006.01)
*G01S 13/88* (2006.01)
(Continued)

(52) U.S. Cl.
CPC ............ *G01S 13/888* (2013.01); *G01S 7/025* (2013.01); *G01S 13/89* (2013.01)

(58) Field of Classification Search
CPC ..... G01S 12/887; G01S 12/888; G01S 13/887
(Continued)

(56) References Cited

U.S. PATENT DOCUMENTS 5,008,680 A * 4/1991 Willey .................. H01Q 3/385
                                                 342/372
5,673,050 A   9/1997 Moussally
(Continued)

FOREIGN PATENT DOCUMENTS

WO   WO2010-055749   * 5/2010

OTHER PUBLICATIONS

Zhang et al., "Full Polarimetric Beam-Forming Algorithm for Through-The-Wall Radar Imaging", Radio Science, vol. 46, RSOE16, Oct. 25, 2011.*

(Continued)

*Primary Examiner* — Frank J McGue
(74) *Attorney, Agent, or Firm* — Swanson & Bratschun, L.L.C.

(57) ABSTRACT

The invention relates to a method of detecting a scatterer in a structure, such as a building structure. The method comprises the steps of transmitting from one or a multiple number of positions exterior to a structure, a wall probing radar signal towards the structure. The method also comprises the step of receiving, at one or a multiple number of positions exterior to the structure, signals that have been reflected by scatterers in the structure. Further, the method comprises the step of filtering, from the received signals, reflection information of a specific scatterer at a specific position. In addition, the method comprises the step of identifying a geometry of the specific scatterer, based on the reflection information. The filtering step comprises applying a phase change algorithm corresponding to a specific scatterer type.

16 Claims, 7 Drawing Sheets

(51) Int. Cl.
*G01S 7/02* (2006.01)
*G01S 13/89* (2006.01)

(58) Field of Classification Search
USPC .......................................................... 342/22
See application file for complete search history.

(56) References Cited

U.S. PATENT DOCUMENTS

| | | | |
|---|---|---|---|
| 7,124,022 B2* | 10/2006 | Carmichael | G06K 9/00885 340/995.14 |
| 7,656,351 B1* | 2/2010 | Rao et al. | 342/359 |
| 8,704,726 B2* | 4/2014 | Nogami | 343/853 |
| 2002/0109624 A1* | 8/2002 | Schutz et al. | 342/28 |
| 2006/0284757 A1* | 12/2006 | Zemany | G01S 13/32 342/22 |
| 2007/0171119 A1* | 7/2007 | Dwelly et al. | 342/28 |
| 2008/0252546 A1* | 10/2008 | Mohamadi | G01S 7/032 343/853 |

OTHER PUBLICATIONS

Jacobsmeyer, "Making Gains in the Vertical Plane", Mar. 1, 2010.*
Baranoski (Jul. 2006) DARPA Special Projects Office, IEEE SAM Workshop, "VisiBuilding: Sensing Through Walls".
International Search Report, from PCT/NL2010/050088, dated May 10, 2010.
Marble and Hero (2006) Proc. of SPIE 6210:1-6, "See Through the Wall Detection and Classification of Scattering Primitives" XP007909604.
Ahmad et al. (2005) IEEE Transactions on Aerospace and Electronic Systems 41(1):271-283 "Synthetic Aperture Beamformer for Imaging Through a Dielectric Wall".
Ahmad and Amin (2008) IEEE Geoscience and Remote Sensing Letters 5(2):176-179 "Three-Dimensional Wideband Beamforming for Imaging Through a Single Wall".
Baranoski (2005) DARPATech 2005 Conference Aug. 9-11, 2005:155-159 "Urban Operations, The New Frontier for Radar".
Baranoski (2008) HPEC 2008 Sep. 23-25, 2008:1-19 "New Sensor Signal Processor Paradigms: When One Pass Isn't Enough".
Baranoski (2008) Journal of the Franklin Institute 345:556-569 "Through-wall imaging: Historical perspective and future directions".
Burchett (2006) IET Civil Radar Seminar Jun. 5, 2006:1-49 "Advances in Short Range Radar Systems".
Camero, Xaver 400 Through Wall Vision Product Specification, "Compact, Tactical Through-Wall Vision System" (publication known about before priority date of U.S. Appl. No. 13/145,127).
Camero, Xaver 800 Through Wall Vision Product Specification, "High Performance, ISR Through-Wall Vision System" (publication known about before priority date of U.S. Appl. No. 13/145,127).
Dogaru and Le Sensors and Electron Devices Directorate; U.S. Army Research Laboratory; Adelphi, Maryland 20783-1197:1-8 "Ultra-Wideband Radar for Building Interior Imaging".
European Search Report from EP 09155662.1, dated Aug. 31, 2009.
O'Neill et al. (2003) Geoscience and Remote Sensing Symposium, Jul. 21-25, 2003 7:4157-4159 "Combining GPR and EMI Data for Discrimination of Multiple Subsurface Metallic Objects".
Song et al. (2005) IEEE Transactions on Geoscience and Remote Sensing 43(12):2793-2798 "Through-Wall Imaging (TWI) by Radar: 2-D Tomographic Results and Analyses".
Subotic et al. (2008) Michigan Tech Research Institute 5189-5192 "Parametric Reconstruction of Internal Building Structures via Canonical Scattering Mechanisms" Downloaded on Feb. 2, 2009 from IEEE Xplore.
Time Domain Corporation, RadarVision 2i Product Specification, "Introducing the Second Generation Through-Wall Motion Detection Radar for Enhanced Tactical Entry" Available Website: www.radarvision.com (publication known about before priority date of U.S. Appl. No. 13/145,127).
Time Domain Corporation, SodierVision Product Specification, "Introducing Through-Wall Motion Detection Radar for Military Operations in Urban Terrain" (publication known about before priority date of U.S. Appl. No. 13/145,127).

* cited by examiner

METHOD OF DETECTING A SCATTERER IN A STRUCTURE, A RADAR SYSTEM AND A COMPUTER PROGRAM PRODUCT

RELATED APPLICATIONS

This application is a 35 U.S.C. §371 national phase application of PCT/NL2010/050088 (WO 2010/095946), filed on Feb. 22, 2010, entitled "A Method of Detecting a Scatterer in a Structure, a Radar System and a Computer Program Product", which application claims priority from European Application Nos. 09155662.1, filed Mar. 19, 2009, and 09153368.7, filed Feb. 20, 2009, each of which is incorporated herein by reference in its entirety.

The invention relates to a method of detecting a scatterer in a structure, comprising the steps of transmitting from one or a multiple number of positions exterior to a structure, a wall probing radar signal towards the structure, receiving, at one or a multiple number of positions exterior to the structure, signals that have been reflected by scatterers in the structure, and filtering, from the received signals, reflection information of a specific scatterer at a specific position.

Many commercial through-the-wall radar systems exist. Generally, these are small, hand-held systems that have to be pushed against the wall and detect moving persons in the room directly behind the wall. Sometimes even the heart beat or breathing of humans can be detected, but still it is a motion that is detected. Stationary objects are usually filtered-out; some systems provide the width and depth of the room directly behind the wall. These systems are usually not capable of measuring the height of a room and three-dimensional imaging of a building can in principle not be performed using such hand-held systems. Moreover, mapping a complete building with this type of systems is very impractical, since they are small, hand-held systems with a limited measurement range.

The development of radar systems to image a complete building and generate a three-dimensional building map is in a premature stage. Most studies described in literature formulate the problem of three-dimensional radar building imaging as an inverse electro-magnetic scattering problem. Solving the inverse scattering problem for a very complicated environment such as the inside of a building is not a trivial task. Therefore, the inverse problem is generally simplified by considering only propagation through a single wall and adopting an idealized model for the wall (i.e. uniform walls without windows or doors and only right angles). Often it is even assumed that the dielectric constant and thickness of the wall are known. Then simpler methods such as Physical Optics can be used to calculate the complete propagation path of a radar wave (in the time domain). Consequently, the phase reference function needed to perform beamforming can be determined. Decomposition algorithms can be applied to discriminate the backscatter from different types of scatterers. Typically, a solution is refined by iteratively applying signal processing and by updating the building model.

Consequently, these methods are computationally demanding and may not be performed in real time. Moreover, the scattering problem becomes increasingly difficult when the walls are inhomogeneous or when transmission through several walls is considered. Thus when the map of a complete building is to be obtained, these methods require very long computation times.

Time domain methods need to adopt a simple model for building walls in order to reduce the complexity of the inverse problem and they are generally limited to transmission through a single wall. When transmission through several walls has to be considered, such that the map of the inner building can be obtained, the complexity of the inverse problem increases rapidly and computation of the complete propagation path of waves becomes unfeasible.

It is further known that principle scatterers can be distinguished by making use of the polarimetric properties of the backscatter. For highly reflective materials, the polarization of a radar wave flips upon reflection, i.e. when the incident wave is circular right-hand polarized, the reflected wave will be circular left-hand polarized. By exploiting the polarization flip, even-bounce and odd-bounce reflections can be discriminated, which in turn allows the discrimination of dihedral corners (even-bounce) and trihedral corners (odd-bounce).

An obvious drawback of this method is that planar walls give rise to an odd-bounce reflection as well. Therefore, planar walls and trihedral corners can not be readily discriminated. Another drawback is that, when the angle of incidence is equal to the Brewster angle, one polarization component vanishes and it is no longer feasible to determine the polarization flip. Thus this method may not be very robust in an efficient drive-by scenario to map a complete building because the angle of incidence varies as function of azimuth position.

Methods that directly interpret the radar image to obtain the ground map of a building have also been described. Currently, these methods are limited to two-dimensional imaging of buildings. Apart from providing restricted mapping information, the latter methods are very time-consuming.

It is an object of the invention to provide a method according to the preamble for obtaining robust three-dimensional information of the building without significant increase of computation time. Thereto, the method according to the invention comprises the step of identifying a geometry of the specific scatterer, based on the reflection information, wherein the filtering step comprises applying a phase change algorithm corresponding to a specific scatterer type.

By filtering the received radar signals to obtain reflection information of a scatterer at a specific position and by using the reflection information to identify a geometry of the specific scatterer, geometry information of scatterers can elegantly be linked to retrieve an overall three-dimensional map of the structure. As an example, a linear phase change algorithm and/or a quadratic phase change algorithm can be applied to correspond to a specific scatterer. Also, more complex algorithms depending on the specific scatterer type can be applied. Further, the filtering step can include applying a phase and amplitude change algorithm to enhance the filtering properties. Since, in principle, several efficient filtering algorithms for obtaining specific position dependent reflection information can be applied, the method according to the invention may be performed without requiring excessive processing time. Thus, using reflection information, scatterers can be identified and characterized and from these identified scatterers, a building map can be constructed.

Further, the invention relates to a radar system.

Additionally, the invention relates to a computer program product. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

Other advantageous embodiments according to the invention are described in the following claims.

By way of example only, embodiments of the present invention will now be described with reference to the accompanying figures in which FIG. 1 shows a schematic perspective view of a radar system according to the invention;

FIG. 2b shows a schematic side view of a transceiver module of the radar system shown in FIG. 2a;

The figures are merely schematic views of preferred embodiments according to the invention. In the figures, the same reference numbers refer to equal or corresponding parts.

Figure 1:
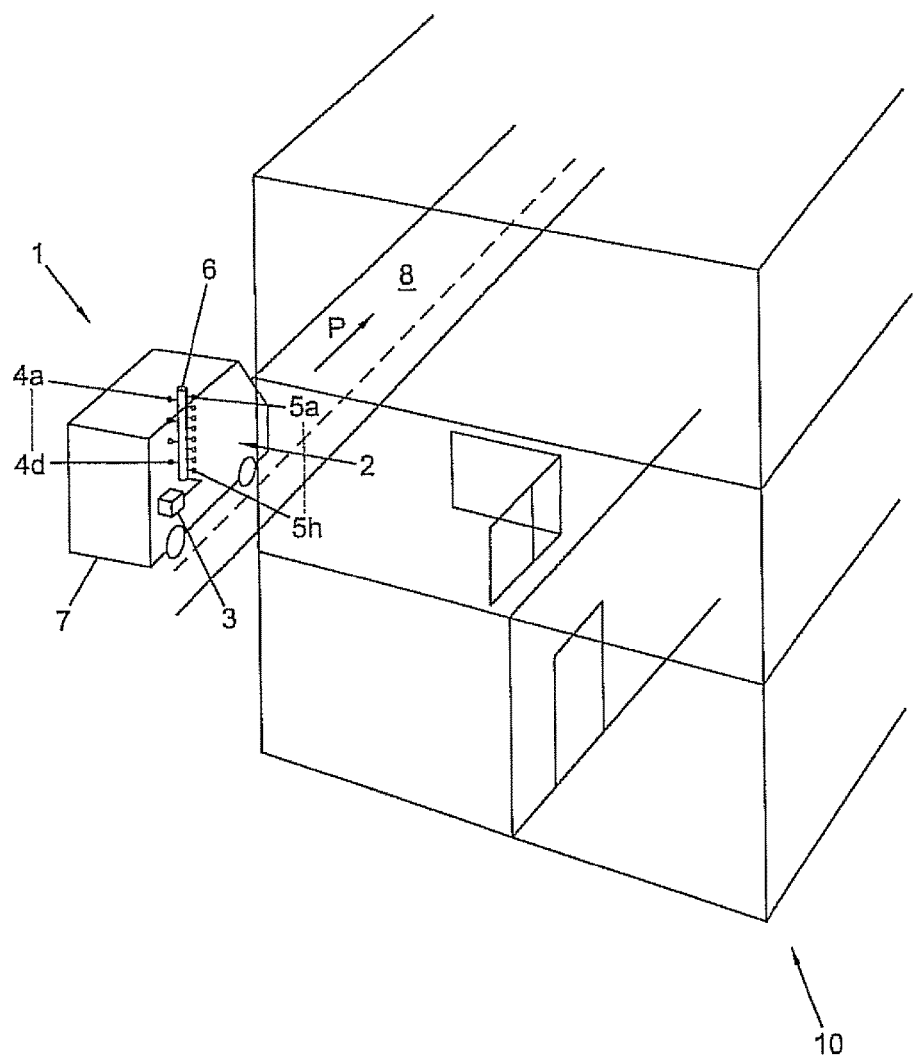

FIG. 1 shows a perspective view of a radar system 1 according to the invention. The radar system 1 comprises a transceiver module 2 and a processor unit 3. The transceiver module includes a multiple number of transmitters 4a-d and receivers 5a-h arranged in a planar array. In the shown embodiment an array of transmitters 4 and receivers 5 have been fixed to a common supporting mast 6. The processor unit 3 is connected to the mast 6 for communicating data with the transmitters 4a-d and receivers 5a-h.

The radar system 1 is carried on a movable platform, viz. a van 7 as shown in FIG. 1. The radar system can also be carried by other movable platform types, e.g. a train or a helicopter. Further, the processor unit 3 can be located remote, so that the radar data can be processed at another location, in real time or at a later instant.

During operation of the radar system 1, the van 7 is moving on a path 8 in a path direction P along a building 10 that is to be mapped. The position and orientation of the van 7 is continuously monitored and related to the obtained data. The transmitters 4a-d transmit a wall probing radar signal towards the building 10. The wall probing radar signal 11 is reflected by scatterers in the building 10. Such reflected signals 12 are received by the receivers 5a-h for processing. As a result of the processing step, individual scatterers can be identified with respect to position, orientation and/or scatterer type.

Figure 2A:
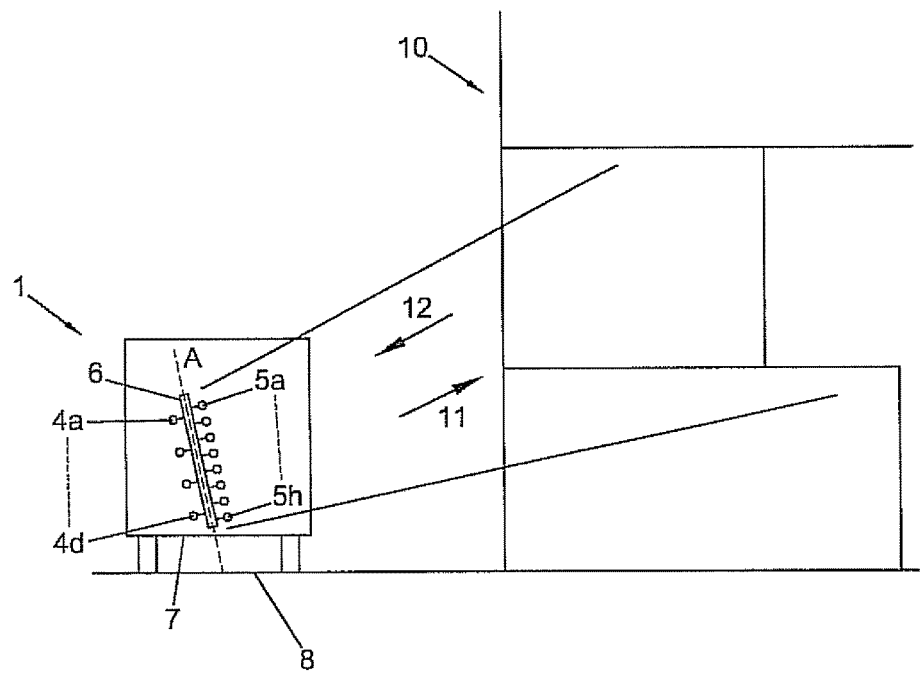
FIG. 2a shows a schematic rear view of the radar system as shown in FIG. 1.

FIG. 2a shows a schematic rear view of the radar system 1. The longitudinal axis A of the mast 6 is slightly tilted with respect to the vertical direction so that especially the ground floor as well as the floor above the ground floor can be sensed. Obviously, the mast 6 can be oriented otherwise, e.g. substantially in a vertical direction.

Figure 2B:
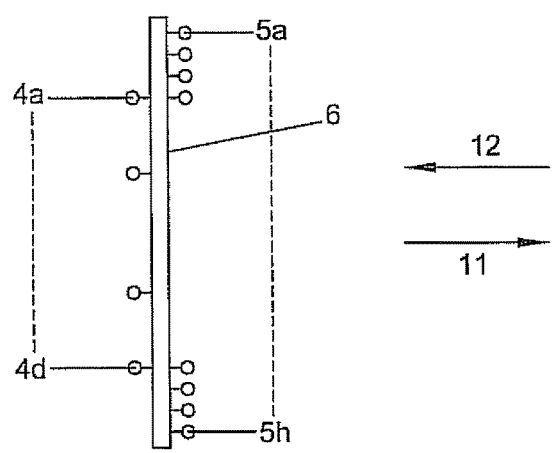

FIG. 2b shows a schematic side view of a transceiver module 2 of the radar system 1. The multiple number N of transmitters 4a-d and the multiple number of M receivers 5a-h have been configured in a so-called multiple input multiple output (MIMO) constellation so that N×M different transmitter-receiver combinations can sense the building, thereby elegantly reducing the required number of transmitters and receivers. In such a specific configuration the number of virtual transmitter-receiver combinations can add up to the number of transmitters multiplied by the number of receivers, thereby efficiently using the hardware components.

The processing steps, performed on the received reflected radar signals 12, include the step of filtering, from the received signals, reflection information of a specific scatterer at a specific position, and the step of identifying a geometry of the specific scatterer, based on the reflection information.

More specifically, many geometry types might be classified, such as a planar wall, a 2 wall corner, a 3 wall corner, a cylinder, a pillar or a plate. Further, in many cases, the orientation of the scatterer can be identified.

In an embodiment according to the invention, the identified scatterer geometry may include a planar wall, a dihedral corner in a horizontal direction, a dihedral corner in a vertical direction or a trihedral corner.

Figure 3A:
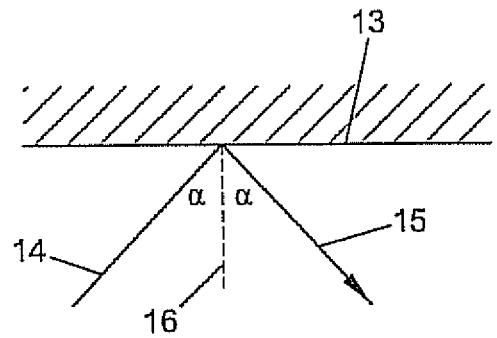
FIG. 3a shows a reflection path of a radar signal travelling towards a planar wall.
Figure 3B:
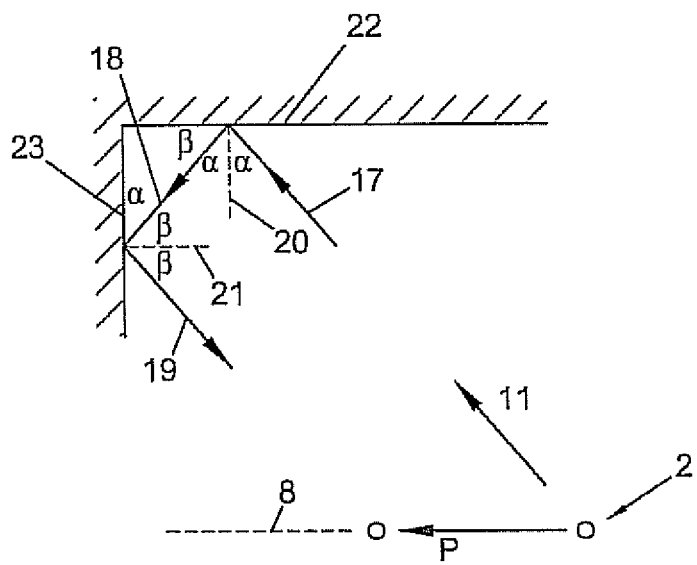
FIG. 3b shows a reflection path of a radar signal travelling towards a dihedral corner in a vertical direction.

FIGS. 3a-d show a reflection path of a radar signal travelling towards an above-mentioned specific scatterer geometry, respectively. In FIG. 3a, the geometry is a planar wall 13. The incoming radar signal 14 reflects against the wall 13, the reflection angle α with respect to the normal 16 coinciding with the incidence angle. Obviously, the specular reflected radar signal 14 travels in the opposite incidence direction only when the incidence angle vanishes. In FIG. 3b, being a schematic top view, two transversely oriented planar sections 22, 23 coincide in a vertically oriented dihedral corner or edge. An incoming radar signal 17 is reflected twice when following a reflected path 18 and a twice reflected path 19 being in opposite direction to the original incidence direction, when viewed from top to bottom, independent of the specific incidence angle α. However, in the vertical direction, only opposite direction applies when the incidence wave is in a horizontal plane. FIG. 3b also shows the transceiver module 2 moving along the path 8 in the path direction P.

Figure 3C:
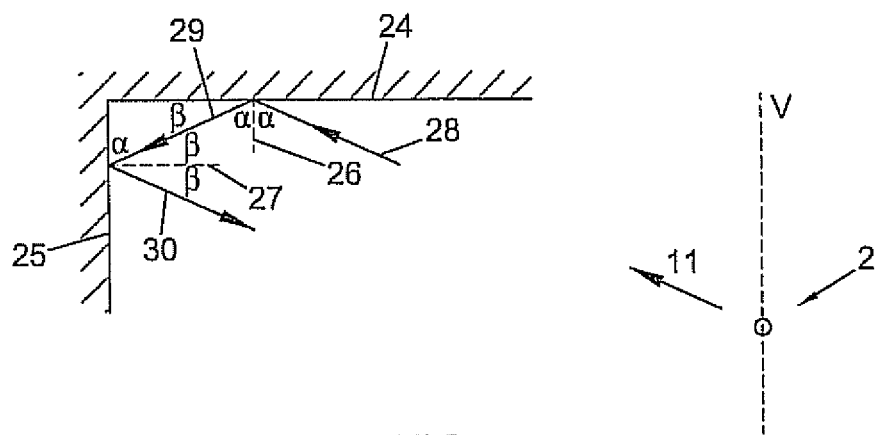
FIG. 3c shows a reflection path of a radar signal travelling towards a dihedral corner in a horizontal direction.

FIG. 3c being a schematic side view shows a reflection path 28, 29, 30 of a radar signal travelling towards a dihedral corner in a horizontal direction. The corner is formed by a horizontal floor 24 and a vertical wall 25. Similarly, opposite specular reflection is independent of incidence angle α when moving the transmitter and/or receiver in the vertical direction, while the opposite reflection is only present when the incidence angle is in a vertical plane.

Figure 3D:
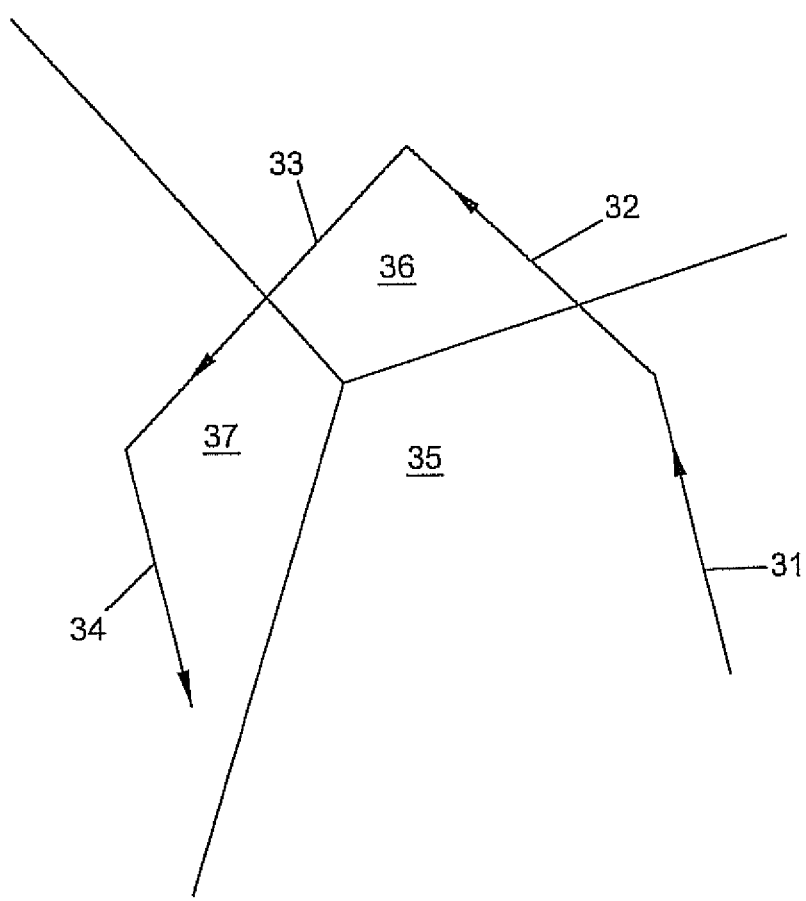
FIG. 3d shows a reflection path of a radar signal travelling towards a trihedral corner.

FIG. 3d shows a reflection path 31, 32, 33, 34 of a radar signal travelling towards a trihedral corner formed by two vertical walls 35, 37 and a horizontal wall 36. Here, three reflections occur and opposite specular reflection always occurs, independent of the angle of incidence.

Based on the insight that depending on the scatterer type and the incidence direction of the radar signal, specular reflection may or may not occur, reflection information of scatterers at specific positions can be filtered from the received reflection signals.

In a first embodiment according to the invention, the filter step includes a linear phase change in the horizontal direction and in the vertical direction that is applied to the received reflected signal, so that specular reflection characteristics lead to the identification of horizontally and vertically oriented planar wall scatterers. The application of a linear phase change filter is also called range-doppler processing.

In a second and third embodiment according to the invention, the filter step includes the application of a quadratic phase change, also known as range migration or synthetic aperture radar (SAR), with respect to the horizontal or vertical direction, while a linear phase change filter may be applied to the vertical and horizontal direction, respectively. In this way a point scatterer or a dihedral corner in a horizontal or vertical direction may be identified. Since in general more measurements can be performed in the horizontal direction, a vertically oriented dihedral corner can be identified in a more robust way than a horizontally oriented dihedral corner.

In a fourth embodiment according to the invention, the filter step includes a quadratic phase change with respect to both the horizontal and vertical direction that is applied to the reflected signal, so that a point scatterer or trihedral corner in the horizontal and vertical direction may be identified.

It is noted that the method according to the invention preferably combines the first, second, third and fourth embodiment described above, so that multiple scatterer geometries can be identified for constructing a building map.

In an embodiment according to the invention, the filtering step comprises applying a far-field beam forming technique and/or a near-field beam focussing technique, e.g. in the elevation direction so that in an efficient way multiple narrow virtual beams in the vertical direction can be generated while the beams are wide in the horizontal direction so that SAR can be performed. The digital beam forming technique can be applied by performing a FFT on the linear array of the virtual transmitter/receiver combinations.

According to a further aspect to the invention, the method includes the step of constructing a three-dimensional building map by linking scatterers from which the geometry and orientation has been identified. Advantageously, in a relatively easy, fast and efficient way, an internal building structure can be sensed.

According to yet a further aspect to the invention, the method also includes transmitting and receiving radar signals having different polarization types. As such, per transmitter/receiver combination, four polarization situations may occur, e.g. H transmitted and H received, H transmitted and V received, V transmitted and H received, and V transmitted and V received. Here, the symbols H and V denote horizontally polarized and vertically polarized, respectively. By using different polarization types, more reflection information can be obtained compared to the single polarization situation.

Figure 4:
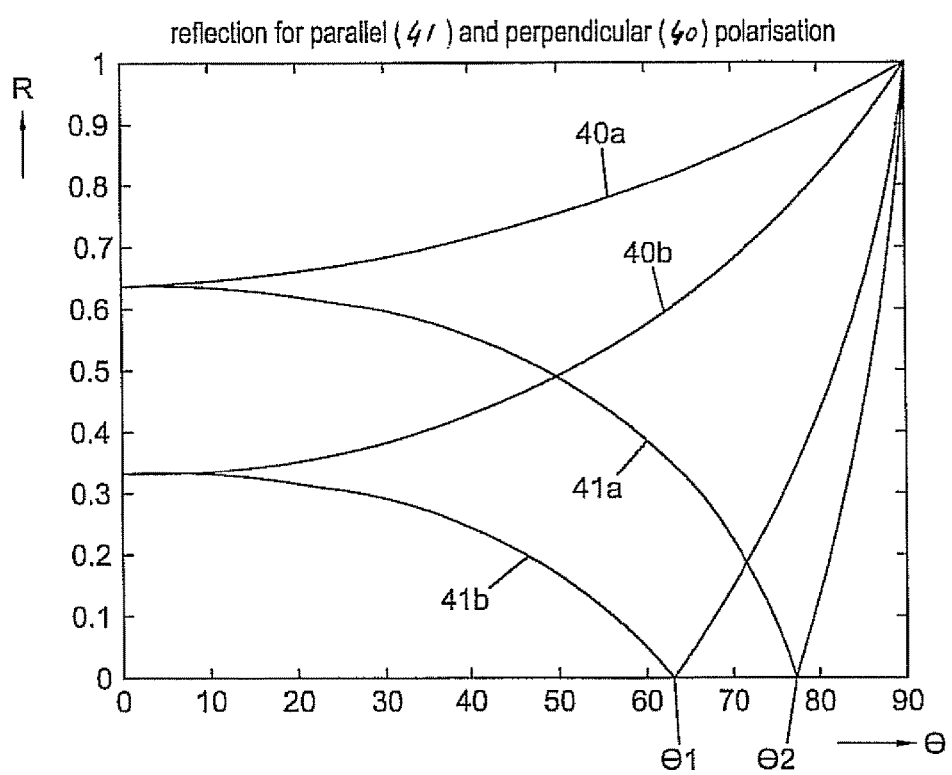
FIG. 4 shows a reflection diagram of reflected radar signals.

FIG. 4 shows a specular reflection diagram of reflected radar signals wherein a specular reflection coefficient R is shown as a function of the angle of incidence θ with respect to the normal of the reflection plane. The diagram shows a first specular reflection coefficient 40a, b of a field that is perpendicular to the scattering plane. The scattering plane is the plane containing the propagation direction lines of both the incidence and reflected waves. The first specular reflection coefficient 40a, b does not change significantly. The diagram further shows a second and third specular reflection coefficient 41a, b of a field parallel to the scattering plane. Depending on material properties of the reflecting plane, in particular the relative dielectric permittivity, the specular reflection coefficient vanishes at a particular angle $\theta_1$, $\theta_2$ and changes its sign when the angle of incidence becomes greater than said particular angle. In the shown Figure, the specular reflection coefficients depend on a relative dielectric permittivity 20 (reflection coefficient 40a and 40b) and on relative dielectric permittivity 4 (reflection coefficient 41a and 41b). Such information can be used to obtain particular geometric and material information of the scatterer.

It appears that in the dihedral corner situation, the VV polarization shows the case where the signal vanishes and changes its sign at grazing angles when the corner is horizontally oriented, while in the HH polarization the signal does not drop. Similarly, in the vertically oriented dihedral corner situation, the VV polarization signal does not drop while the HH polarization shows a vanishing signal changing its sign at grazing angles. According to an aspect of the invention, the vanishing feature of the signal is used as an identifier for the dihedral corner situations.

Further, the method may include the step of observing that a signal of a first polarization type changes its sign while a signal of a second polarization maintains its sign as a function of the angle with respect to a reflection section of the scatterer not only for identification of a dihedral corner but also for determination of material properties of the scatterer, since the specific angle at which the first polarization type signal changes vanishes depends on the material characteristics of the reflection wall in a known manner.

The radar system 1 can be used to map a building in 3D by using drive-by stand-off radar. This capability will allow intelligence, reconnaissance and clearance tasks to be performed by driving by or around a building with a small van or a remotely controlled vehicle, thus improving security, response time, covertness, and reliability of these tasks.

The system will map a building in 3D by using drive-by stand-off radar. Each dimension is probed by a principle suitable to the drive-by scenario. This is done with a flexible configurable polarimetric frequency-modulated continuous-wave synthetic aperture radar (FMCW SAR) measurement set-up. It allows measuring several independent characteristics of the scattering objects of a building. These characteristics are combined to identify and locate the principle scatterers within a building (i.e. planar walls, dihedral corners formed by two walls, and trihedral corners formed by two walls and the floor or ceiling) and to reconstruct the building construction plan based on the principle scatterers. The preferable implementation is an FMCW radar in a covert van or truck with a vertical array of antenna elements, and local signal processing with an interactive screen for the operator to interpret the building map.

The 3D mapping system can advantageously be constructed by comprising a polarimetric Multiple Input Multiple Output (MIMO) array antenna, a RF (radio frequency) front-end, an Inertial Movement Unit (IMU), and a signal processing computer, further reducing the registered amount of hardware. The linear array antenna is vertically mounted on a van. By driving past a building, a 2D measurement grid can be built-up. In elevation the grid is formed by the measurements of each transmit antenna element and receive antenna element combination, whereas in azimuth the grid is formed by the measurements taken at different platform positions. At each grid point a range profile is obtained for each polarization, resulting in a 3D raw radar data cube for each component of the polarization scattering matrix. During the measurement, the IMU collects position data of each antenna element. These positions are used to correct the effect of antenna movements on the measurement grid. The processor unit performs antenna location corrections, translates data acquisition points to range profile measurements, and applies coherent filters matched to the various types of specular scattering objects in order to locate and classify these scattering objects.

According to an aspect of the invention, only specular reflections are taken into account, the principle scatterers inside a building exhibit different phase relationships between the grid points in two dimensions. These phase relationships can be resolved from the 3D radar data cube. By exploiting the phase relations between the grid points, planar walls, dihedral corners, and trihedral corners can be distinguished.

Planar surfaces are formed by walls that are parallel to the radar platform track. Classification of parallel walls is required to determine the depth of a room. Large planar walls will induce a linear phase change in azimuth as well as in elevation.

Vertical dihedral corners are formed by the walls of a room. Classification of vertical corners is required to determine the width of a room. Vertical corners will cause a quadratic phase change in azimuth and a linear phase change in elevation.

Horizontal dihedral corners are formed by a wall and the ceiling or floor of a room. Classification of horizontal corners is needed to determine the height of a room. Horizontal corners will give rise to a linear phase change in azimuth and a quadratic phase change in elevation.

Trihedral corners are formed by two walls and the floor or ceiling of a room. Classification of trihedral corners is required to determine the location of the corners of a room. Trihedral corners will give rise to a quadratic phase change in azimuth as well as in elevation.

According to an aspect of the invention the radar data are converted to the range-Doppler domain to determine walls that are parallel to the platform track. Such walls induce a linear phase change over the measurement grid points. In the range-Doppler domain, this will lead to a focused response at the nominal range of the wall at a certain Doppler frequency that depends on the angle between the wall and the platform track. Thus from the range-Doppler response, the nominal range to the wall and the angle of the wall can be estimated. Similarly, the range-Doppler response in vertical direction provides the angle or direction line of the vertical dihedral corner, and in horizontal direction the line angle with respect to the SAR path of the horizontal dihedral corner.

By exploiting near-field beamforming techniques in elevation and SAR techniques in azimuth, the corners of a room, and thus the wall height and length, can be determined. In near-field beamforming and SAR, the quadratic phase change from grid point to grid point is compensated in the range-Doppler domain by multiplication with a phase reference. The ideal phase reference is updated by using the angle of a wall estimated from the range-Doppler response. Subsequently, the data are converted back to the range-time domain. The combination of near-field beamforming and SAR processing will lead to focused responses of dihedral and trihedral corners. From the focused response the range, azimuth, and elevation position of dihedral and trihedral corners can be estimated.

In principle, in order to determine the dimensions of a room it is sufficient to know the location of the corners of the room. Therefore, when the principle scatterers (corners and planar walls) are classified and located in 3D, the inner-building structures can be resolved and a 3D map of the building can be synthesized.

When a polarized radar wave reflects from a wall, the polarization of the reflected wave may change with respect to the polarization of the incident wave. A polarized radar wave can be described by two linear, orthogonal polarization components; one component in the scattering plane and one component perpendicular to the scattering plane. The scattering plane is the plane containing the propagation direction lines of both the incident and the reflected waves. When the angle of incidence is equal to the so-called Brewster angle, the polarization component parallel to the scattering plane vanishes. As a result, it is less reliable to detect and identify vertical dihedral corners and horizontal dihedral corners within a building by using just a single polarization. Therefore, the radar system is preferably fully polarimetric.

What is even more, by exploiting the Brewster angle, the material of walls can be determined. A filter corresponding to such a specific scatterer geometry can be constructed and applied. When the radar platform drives by a building, the reflection from a wall or corner will vanish for a certain polarization whereas the reflection will remain for the other polarization components. The angle of incidence at which this occurs is the Brewster angle of the wall. When the Brewster angle is known, the relative permittivity of the wall can be determined, providing a good indication of the type of material (wood, brick, concrete . . . ). Apart from the location of walls, the material of walls is also important information for (police) assault squads.

In the described method range-Doppler, near-field beamforming, and synthetic aperture radar techniques are used to detect, discriminate, and locate principle scatterers. These are all frequency domain processing techniques, which require the calculation of a Fourier transform and an inverse Fourier transform. Fourier transforms can be efficiently calculated by using Fast Fourier Transform (FFT) algorithms, as a result these processing techniques are not demanding with respect to computation time. The map of a building can be obtained in near real-time when using the method according to the invention.

With the method according to the invention, the inner building can be mapped and there is no need to adopt a model for the building walls. Principle scatterers are discriminated by exploiting the phase change from grid point to grid point. The matched filters used in the signal processing are tuned to either linear or quadratic phase changes depending on the type of principle scatterer to be identified. The ideal phase relation for a certain type of principle scatterer will be affected by the transmission through walls, but the basic shape will be preserved. Therefore, the method according to the invention is very robust in discriminating principle scatterers even when they are located in the inner building.

According to an aspect of the invention, information for the first processing step, i.e. range-Doppler processing, is used to update the second processing step, i.e. near-field beamforming and SAR. When a planar wall is not parallel to the radar platform track the quadratic phase relation will comprise a linear phase term. From range-Doppler processing, the angle of planar walls with respect to the platform track is obtained. Knowledge of the angle is used to refine the quadratic phase reference and include the linear term. Thus the signal processing can be adapted to the specific building characteristics without the need for iterative processing steps or the use of a building model.

The signal processing techniques, i.e. range-Doppler processing and near-field beamforming, are applied in azimuth and elevation at the same time. Therefore, not only the ground floor, but also the first floor of the building can be mapped when driving past a building.

The proposed method may combine signal processing techniques from different applications, viz. far-field beam forming and/or near-field beam focussing in elevation, synthetic aperture radar in azimuth, range-Doppler processing in elevation and azimuth. Moreover, information obtained from the range-Doppler processing may be used to optimize the near-field beamforming and synthetic aperture radar processing.

Figure 5:
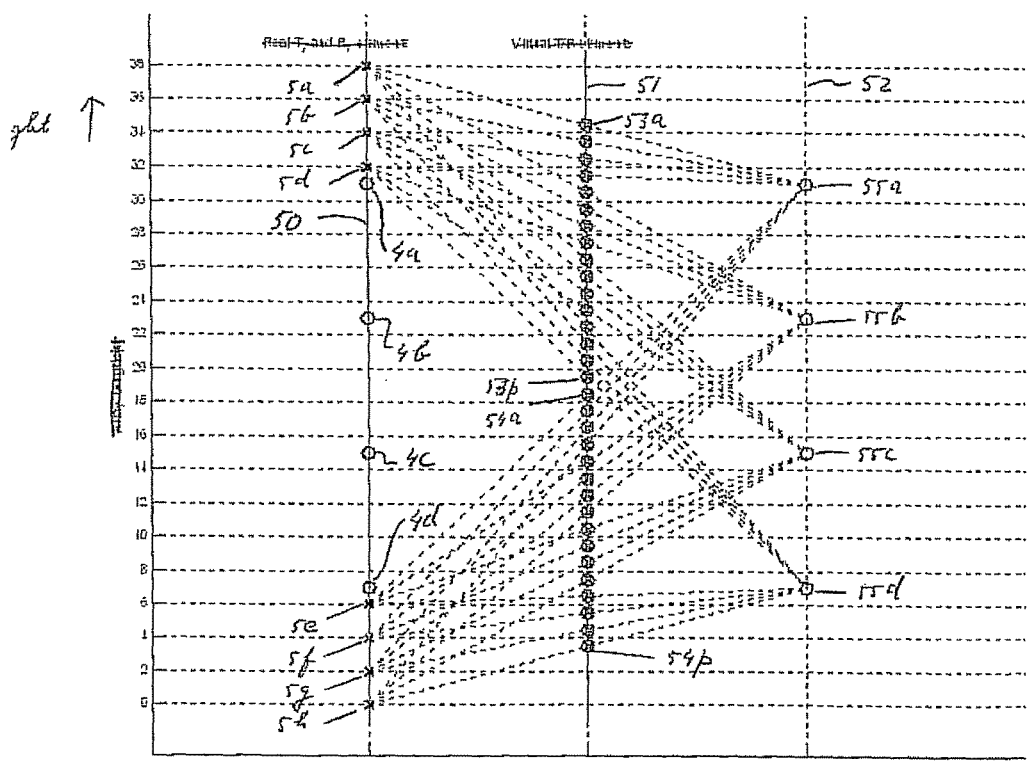
FIG. 5 shows a diagram of a MIMO radar configuration.

FIG. 5 shows a diagram of a MIMO radar configuration in more detail than the schematic side view shown in FIG. 2b. In FIG. 5, the vertical direction denotes the height of transmitters and receivers along a linear array 50. The diagram shows a first linear array including the transmitters 4a-d and the receivers 5a-h. The diagram also shows a second linear array 51 including virtual transmitter/receiver combinations 53a-p, 54a-p. In addition, the diagram shows a third linear array 52 including image sources 4a-d. The second linear array is located between the first and third array, such that the horizontal offset between the first and the second array equals the horizontal offset between the second and the third array. According to the general concept of the MIMO radar configuration, a virtual transmitter/receiver combination is located half way between an actual transmitter and receiver. As an example, a virtual transmitter/receiver combination 53a, also called phantom or synthetic transmitter/receiver combination, is located between the highest receiver 5a and a highest transmitter 4a, 55a. A signal received at the highest receiver 5a after a signal has been transmitted from the highest transmitter 4a is approximately the same is a signal transmitted by the highest virtual transmitter 53a and received by the virtual receiver 53a. By properly designing actual transmitter and receiver positions, starting from a virtual transmitter/receiver combination array, redundant combinations of transmitters and receivers can be avoided. Here, the principle of reciprocity can be exploited. In particular, a virtual transmitter/receiver array can be constructed wherein the virtual transmitter/receiver combinations are equidistant and add up to the number of actual transmitters multiplied by the actual number of receivers. In general, the idea of forming a MIMO radar structure can not only be applied in a linear array, but can be extended to a two-dimensional or a three-dimensional transmitter/receiver configuration.

It is noted that the invention can not only be applied in combination with a MIMO radar configuration, but also with other radar configuration, preferably providing a high density virtual source/receiver configuration.

The method of detecting a scatterer in a structure can be performed using dedicated hardware structures, such as FPGA and/or ASIC components. Otherwise, the method can also at least partially be performed using a computer program product comprising instructions for causing a processor of the computer system to perform the above described steps of the method according to the invention. All processing steps can in principle be performed on a single processor. However it is noted that at least one step can be performed on a separate processor, e.g. the step of filtering, from the received signals, reflection information of a specific scatterer at a specific position and/or the step of identifying a geometry of the specific scatterer, based on the reflection information.

Figure 6:
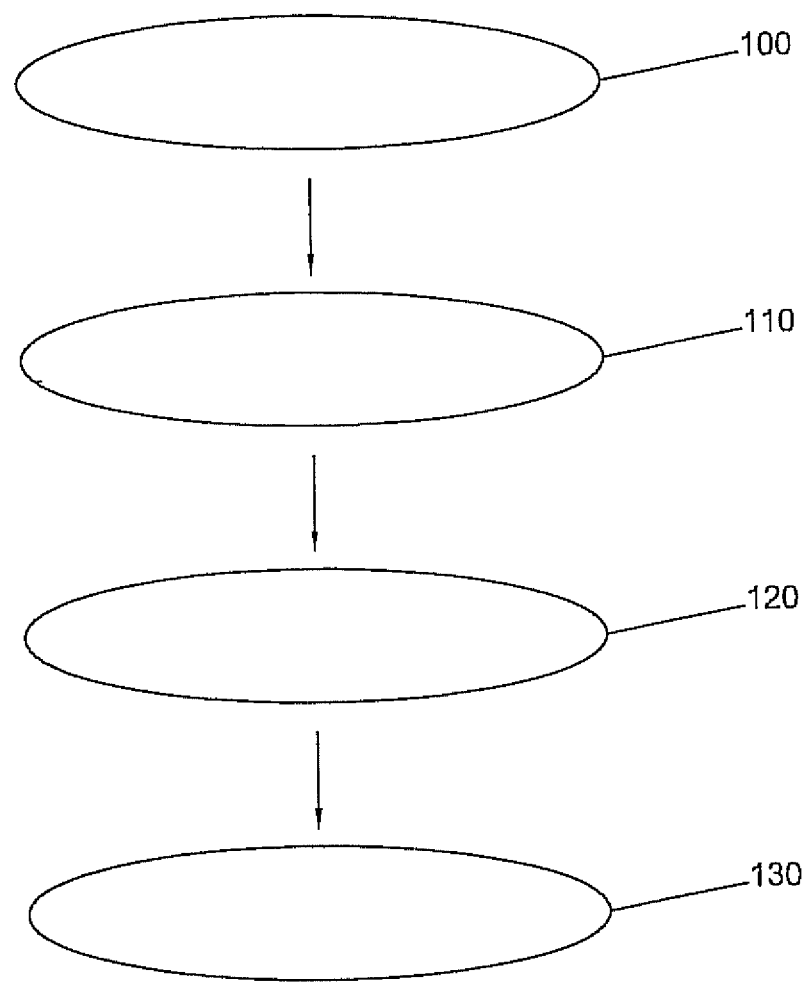
FIG. 6 shows a flow chart of an embodiment of a method according to the invention.

FIG. 6 shows a flow chart of an embodiment of the method according to the invention. A method is used for detecting a scatterer in a structure. The method comprises the steps of transmitting (100) from one or a multiple number of positions exterior to a structure, a wall probing radar signal towards the structure, receiving (110), at one or a multiple number of positions exterior to the structure, signals that have been reflected by scatterers in the structure, filtering (120), from the received signals, reflection information of a specific scatterer at a specific position, and identifying (130) a geometry of the specific scatterer, based on the reflection information, wherein the filtering step (120) comprises applying a phase change algorithm corresponding to a specific scatterer type.

Preferably, a building map is constructed from the identified scatterers information. As described, also the orientation of the scatterers can be identified.

The invention is not restricted to the embodiments described herein. It will be understood that many variants are possible.

It is noted that the radar signal is a frequency modulated continuous wave, preferably a linear frequency modulated continuous wave. However, also other radar signals can be applied, such as pulsed signals.

Further, in principle, a single transmitter and/or a single receiver gathering the data of the aperture plane can be applied to generate the radar data. The aperture plane is defined as the plane wherein both the moving path of the transmitters and receivers, and the virtual antenna array extend. Further, a fixed transmitter/receiver configuration can in principle be applied in the horizontal direction, as an alternative to using a movable platform.

The method according to the invention of detecting a scatterer in a structure can be employed for three-dimensional mapping of a structure, such as a building structure.

The identified scatterer geometry can be formed from a flat surface, a curved surface or from a single or multiple intersections of flat or curved surfaces. A filter corresponding to such a specific scatterer geometry can be constructed and applied.

Other such variants will be obvious for the person skilled in the art and are considered to lie within the scope of the invention as formulated in the following claims.

The invention claimed is:

1. A method of mapping a scatterer in a structure, comprising the steps of:
   moving a platform along the structure;
   transmitting, while the platform is continuously moving along the structure, from one or a multiple number of positions on the moving platform exterior to a structure, a wall probing radar signal towards the structure;
   receiving, while the platform is continuously moving along the structure, at one or a multiple number of positions on the moving platform exterior to the structure, radar signals that have been reflected by scatterers in the structure;
   filtering, from the received signals, reflection information of a specific scatterer at a specific position;
   identifying a geometry of the specific scatterer, based on the reflection information,
   wherein the filtering step comprises applying a phase change algorithm corresponding to a specific scatterer type, wherein the phase change algorithm uses at least two different measurement positions of the moving platform as the platform is continuously moving to identify and map the specific scatterer; and
   mapping the specific scatterer in the structure.

2. The method according to claim 1, wherein the filtering step comprises at least one of applying a linear phase change algorithm and a quadratic phase change algorithm.

3. The method according to claim 1, further comprising constructing a three-dimensional map of a building structure based on the identified scatterer geometry.

4. The method according claim 1, wherein the identified scatterer geometry is formed from at least one of a flat surface, a curved surface, a single intersection of flat or curved surfaces or multiple intersections of flat or curved surfaces.

5. The method according to claim 1, wherein the filtering step comprises applying at least one of a far-field beam forming technique and a near-field beam focusing technique.

6. The method according to claim 1, wherein the wall probing radar signal is a frequency modulated continuous wave (FMCW).

7. The method according to claim 1, further comprising determining an orientation of the specific scatterer.

8. The method according to claim 1, further comprising constructing a three-dimensional building map by linking identified geometries of scatterers.

9. The method according to claim 1, further including transmitting and receiving radar signals having different polarization types.

10. The method according to claim 1, further comprising the step of observing signal amplitude and that a signal of a first polarization type changes its sign while a signal of a second polarization maintains its sign as a function of the angle with respect to a reflection section of the scatterer for identification of a dihedral corner and determination of material properties of the scatterer.

11. The method according to claim 1, wherein the identified scatterer geometry comprises at least one of a substantially planar wall, a substantially dihedral corner in a substantially horizontal direction, a dihedral corner in a substantially vertical direction and a trihedral corner.

12. A radar system for mapping a scatterer in a structure, comprising:
a transceiver module on a movable platform moving along the structure and being arranged for:
transmitting, while the platform is continuously moving along the structure, from one or a multiple number of positions on the moving platform exterior to a structure, a wall probing radar signal towards the structure;
receiving, while the platform is continuously moving along the structure, at one or a multiple number of positions on the moving platform exterior to the structure, radar signals that have been reflected by scatterers in the structure; and
a processor arranged for:
filtering, from the received signals, reflection information of a specific scatterer at a specific position;
identifying a geometry of the specific scatterer, based on the reflection information,
wherein the filtering step comprises applying a phase change algorithm corresponding to a specific scatterer type, wherein the phase change algorithm uses at least two different measurement positions of the moving platform as the platform is continuously moving to identify the specific scatterer; and
mapping the specific scatterer in the structure.

13. The system according to claim 12, wherein the transceiver module comprises a multiple number of transmitters and receivers arranged in a linear array.

14. The system according to claim 13, wherein the linear array is slightly tilted with respect to the vertical.

15. The system according to claim 13 wherein the linear array is in a multiple input multiple output (MIMO) configuration.

16. An article of manufacture comprising a non-transitory computer usable medium having encoded thereon a set of instructions executable by a computer system to perform one or more operations for mapping a scatterer in a structure, the set of instructions comprising:
filtering reflection information of a specific scatterer at a specific position, from signals that have been received, at one or a multiple number of positions on a moving platform exterior to a structure, while the platform is continuously moving along the structure, the received radar signals propagating from scatterers after a wall probing radar signal has been transmitted, from one or a multiple number of positions on a moving platform exterior to a structure, towards the structure, while the platform is continuously moving along the structure;
identifying a geometry of the specific scatterer, based on the reflection information,
wherein the filtering step comprises applying a phase change algorithm corresponding to a specific scatterer type and at least two different measurement positions of the moving platform while the platform is continuously moving along the structure; and
mapping the specific scatterer in the structure.

* * * * *